United States Patent
Mori et al.

(10) Patent No.: US 7,048,082 B2
(45) Date of Patent: May 23, 2006

(54) DRIVER'S CAB FOR A WORK VEHICLE

(75) Inventors: Tadashi Mori, Settsu (JP); Koudou Tsuji, Hirakata (JP); Tatsushi Itou, Hirakata (JP)

(73) Assignee: Komatsu Ltd., Tokyo (JP)

(*) Notice: Subject to any disclaimer, the term of this patent is extended or adjusted under 35 U.S.C. 154(b) by 185 days.

(21) Appl. No.: 10/614,287

(22) Filed: Jul. 8, 2003

(65) Prior Publication Data

US 2004/0104060 A1 Jun. 3, 2004

(30) Foreign Application Priority Data

Jul. 10, 2002 (JP) ............................. 2002-201392

(51) Int. Cl.
*B62D 33/06* (2006.01)

(52) U.S. Cl. .............. 180/89.12; 180/311; 296/190.03; 296/190.08

(58) Field of Classification Search ............. 180/89.12, 180/311; 280/784, 785, 756; 296/190.08, 296/190.03, 205
See application file for complete search history.

(56) References Cited

U.S. PATENT DOCUMENTS

| | | | | |
|---|---|---|---|---|
| 3,244,251 A | * | 4/1966 | Duncan | 280/756 |
| 4,135,756 A | * | 1/1979 | Hausmann | 296/190.03 |
| 4,136,985 A | * | 1/1979 | Taul | 403/172 |
| 4,163,578 A | * | 8/1979 | Watson | 296/204 |
| 4,327,938 A | * | 5/1982 | Geissler et al. | 280/784 |
| 4,695,342 A | * | 9/1987 | Belleau et al. | 156/173 |
| 4,917,435 A | * | 4/1990 | Bonnett et al. | 296/190.08 |
| 5,094,313 A | * | 3/1992 | Mauws | 180/210 |
| 5,167,481 A | * | 12/1992 | Gotz | 414/635 |
| 5,280,955 A | * | 1/1994 | Nelson et al. | 280/756 |
| 5,297,844 A | * | 3/1994 | Haustein | 296/190.04 |
| 6,149,228 A | * | 11/2000 | O'Neill et al. | 296/190.03 |
| 6,189,955 B1 | * | 2/2001 | Fryk et al. | 296/190.08 |
| 6,315,351 B1 | * | 11/2001 | Mondragon Sarmiento et al. | 296/190.08 |
| 6,427,795 B1 | * | 8/2002 | Johnson et al. | 180/89.14 |
| 6,485,084 B1 | * | 11/2002 | Sorensen et al. | 296/102 |
| 6,523,885 B1 | * | 2/2003 | Kroning et al. | 296/187.03 |
| 6,568,746 B1 | * | 5/2003 | Sakyo et al. | 296/190.08 |
| 6,769,732 B1 | * | 8/2004 | Sakyo | 296/190.03 |

FOREIGN PATENT DOCUMENTS

| | | | |
|---|---|---|---|
| JP | 11166247 | | 6/1999 |
| JP | 11200417 A | * | 7/1999 |
| JP | 11165660 | | 6/2000 |

* cited by examiner

*Primary Examiner*—Paul N. Dickson
*Assistant Examiner*—Laura B. Rosenberg
(74) *Attorney, Agent, or Firm*—Posz Law Group, PLC; R. Eugene Varndell, Jr.

(57) ABSTRACT

The invention provides a driver's cab for a work vehicle which is provided with a function of effectively transferring an external force applied to a ceiling portion to a pillar without making a structure complex, and can achieve a reinforced structure. In a driver's cab (1) in a working vehicle, the driver's cab being structured by a pipe-like member, a connection member (30 (31)) for dispersing a stress is arranged in a support pillar (11 (12)) in an opposite side particularly in the case that an external force is applied to a transverse outer side of a ceiling portion.

18 Claims, 7 Drawing Sheets

DRIVER'S CAB FOR A WORK VEHICLE

BACKGROUND OF THE INVENTION

1. Field of the Invention

The present invention relates to a driver's cab for a work vehicle such as a construction machine including a excavator, a farm machine including a tractor, and other industrial machines.

2. Description of the Background Art

The work vehicle includes various kinds such as the construction machine, the farm machine, cargo handling machine, and other such machines however, for example, the excavator in the construction machine is widely used for a civil engineering work accompanying with a segment excavation, a construction foundation work, a building dismantling work or the like. In these works, an operator operates and handles the working machine while seeing forward mainly through a front window from an inner side of the driver's cab. For the driver's cab of the work vehicle in which the work is carried out while seeing mainly forward from the inner side of the driver's cab as mentioned above, it is most desired in view of carrying out the work that a forward view from the front window is wide.

In order to correspond to an improvement in the view, if a width of each of front pillars positioned in both forward sides can be made narrow in view of a structure of the driver's cab, this structure can reduce a presence of the structure blocking the operator's view at a time of working. However, in the work in the construction field having a bad false work such as the work in a slope ground in the case of the excavator, there is a risk that a vehicle body inverts.

Accordingly, it is necessary to obtain a structure in which a deformation in a frame of the driver's cab is small so that the operator within the driver's cab can be protected even when the vehicle body inverts and an inverting load is applied to the driver's cab. As a prior art for intending to strengthen the structure of the driver's cab as mentioned above, there has been known, for example, by Japanese Unexamined Patent Publication No. 11-165660 or Japanese Unexamined Patent Publication No. 11-166247.

In the structure disclosed in Japanese Unexamined Patent Publication No. 11-165660, there is shown a structure in which a frame reinforcing plate connects between right and left side surface frames which are provided with hollow portions by combining a side outer panel constituted by a press member with an inner panel. There is described a matter that a strength of the driver's cab is increased against an inverting load by employing the structure mentioned above. Further, in Japanese Unexamined Patent Publication No. 11-166247, there is shown a structure in which a reinforcing plate separating a hollow portion is assembled in an inner portion of a pillar portion formed by a combination between an inner plate and an outer plate which press mold a frame of the driver's cab, and there is described a matter that a strength of the pillar portion is effectively improved while keeping a shape of the conventional driver's cab, thereby intending to improve a strength of the driver's cab against the inverting load.

However, since both of the prior arts mentioned above correspond to a strengthening countermeasure which attaches importance to a cross sectional structure of the pillar portion, the countermeasure does not achieve a structure which is prepared for the case that an external force is applied to a ceiling portion of the driver's cab from an external portion, for example, from a side surface portion and the case that the external force is applied from a rear side of the ceiling portion.

In accordance with the matter mentioned above, for example, when the great external force is applied to a middle position of the ceiling portion in a longitudinal direction of the driver's cab, the external force is not transmitted well to the pillar at the middle position, so that there is a risk the ceiling portion is largely deformed. In order to achieve a structure which can avoid the matter, it is necessary to reinforce the pillar excessively or it is necessary to arrange an additional pillar in the side of the working machine. Further, when there is generated a matter that the external force is applied to a rear portion of the ceiling of the driver's cab, there is a risk that the ceiling is pressed down to an inner side, in view of the structure which is not prepared for the external force. In any case, because of intending a weight saving of the vehicle body and giving a priority to an improvement of visibility at the time of driving, it is absolutely insufficient to transmit the external force to the pillar in the case that the external force is applied to the ceiling portion due to the inverting load, and it is unavoidable that the deformation of the driver's cab becomes large accompanying therewith. In other words, a risk of the operator is great.

SUMMARY OF THE INVENTION

The present invention is made for the purpose of solving the problems mentioned above, and an object of the present invention is to provide a driver's cab for a work vehicle which is provided with a function of effectively transferring an external force applied to a ceiling portion to a pillar without making a structure complex, and can achieve a reinforced structure.

In order to achieve the object mentioned above, in accordance with the present invention, there is provided a driver's cab for a work vehicle, the driver's cab being structured by a pipe-like member, wherein a connection member for dispersing a stress is arranged in a support pillar in an opposite side to a frame to which an external force is applied (first invention).

In accordance with the present invention, even when the external force is applied by a fact that the working vehicle inverts by any chance or a foreign material is directly brought into contact with a side portion of the driver's cab or the like, the stress is dispersed to the support pillar in the opposite side from an external force load portion by the connection member, and it is possible to prevent the frame from being deformed, whereby it is possible to achieve an effect of making a reinforcement of the driver's cab frame optimum.

In the invention mentioned above, it is preferable that the connection member is arranged in front and rear portions opposing to the support pillar of an outer middle portion in the ceiling portion or between the support pillars in the rear portion (second invention). In accordance with this structure, it is possible to achieve an effect of preventing a deformation by the external force applied from the side portion in the ceiling portion and making the reinforcement of the driver's cab frame optimum. Further, it is preferable that the connection member is arranged between a member connecting between both of the support pillars and a rear surface upper transverse member, in addition to the rear support pillar opposing to the outer middle support pillar in the ceiling portion (third invention). In accordance with this structure, since the force transmission is effectively carried out with respect to the support pillar even when the external force is applied to the rear portion of the ceiling portion, it is possible to achieve an effect of preventing a local bending deformation in the rear portion of the ceiling, thereby making the reinforcement of the driver's cab frame optimum.

In the first invention mentioned above, it is preferable that the connection member is arranged between both right and left side surface portions in the ceiling portion (fourth invention). Further, it is preferable that the connection member is arranged in a lower side of the rear surface portion (fifth invention). In accordance with these structures, it is possible to prevent the frame from being deformed even when the great external force is applied to the driver's cab, and it is possible to make the reinforcement of the frame optimum.

In the first to fifth invention mentioned above, it is preferable that the connection member is provided not only in the specific positions but also in required positions in a combination manner (sixth invention) In accordance with this structure, even when the vehicle inverts due to an accident occurred by any chance or the great external force is applied to the upper portion of the driver's cab from the external portion, it is possible to prevent the deformation without relation to a direction in which the external force is applied.

Further, in the first to fifth invention mentioned above, it is preferable that the connection member used for increasing the reinforcing function is structured such that a mounting bracket is attached to at least one end portion thereof (seventh invention). Further, it is preferable that the mounting bracket mounted to the end portion of the connection member is formed in an approximately L shape (eighth invention). In accordance with this structure, when the connection member is previously manufactured in a length size of a position to be expected to be arranged in a state in which the mounting bracket is firmly fixed to the end portion, in an assembling step of the driver's cab frame, and the connection member is weld bonded, for example, to a main frame by the mounting bracket, it is possible to increase a welding strength of the bonded portion. Further, when assembling the other frame members on the basis of the bonded surface of the connection member provided with the mounting bracket, it is possible not only to reinforce but also to make the manufacturing step more rational and reduce jigs and tools, whereby it is possible to achieve an effect of intending to widely reduce a cost. Further, when the mounting bracket employs a bracket having an approximately L shape, there is an advantage that it is possible to further improve an efficiency of the assembling work.

Further, in accordance with the present invention, it is preferable that the connection member used in the ceiling portion for increasing the reinforcing function is a collared pipe-shaped member obtained by integrally forming a member formed in a hat-shaped cross sectional shape with a band-like plate member bonded between both flange portions, and is provided with a bracket portion which can be bonded so as to be mounted on a frame constituting member connected to at least one end portion (ninth invention). In accordance with this structure, it is possible to obtain an effect of minimizing an increase of the weight by using the member obtained by forming a thin plate member and having a high cross sectional strength so as to prevent the driver's cab frame from being deformed and reinforce the driver's cab frame. Further, it is possible to achieve an advantage that the manufacturing step can be intended to be made more rational by integrally forming the bracket portion with the end portion, in conjunction therewith.

DESCRIPTION OF THE PREFERRED EMBODIMENTS

Next, a description will be given of a specific embodiment of a driver's cab for a work vehicle in accordance with the present invention with reference to the accompanying drawings.

Figure 1:
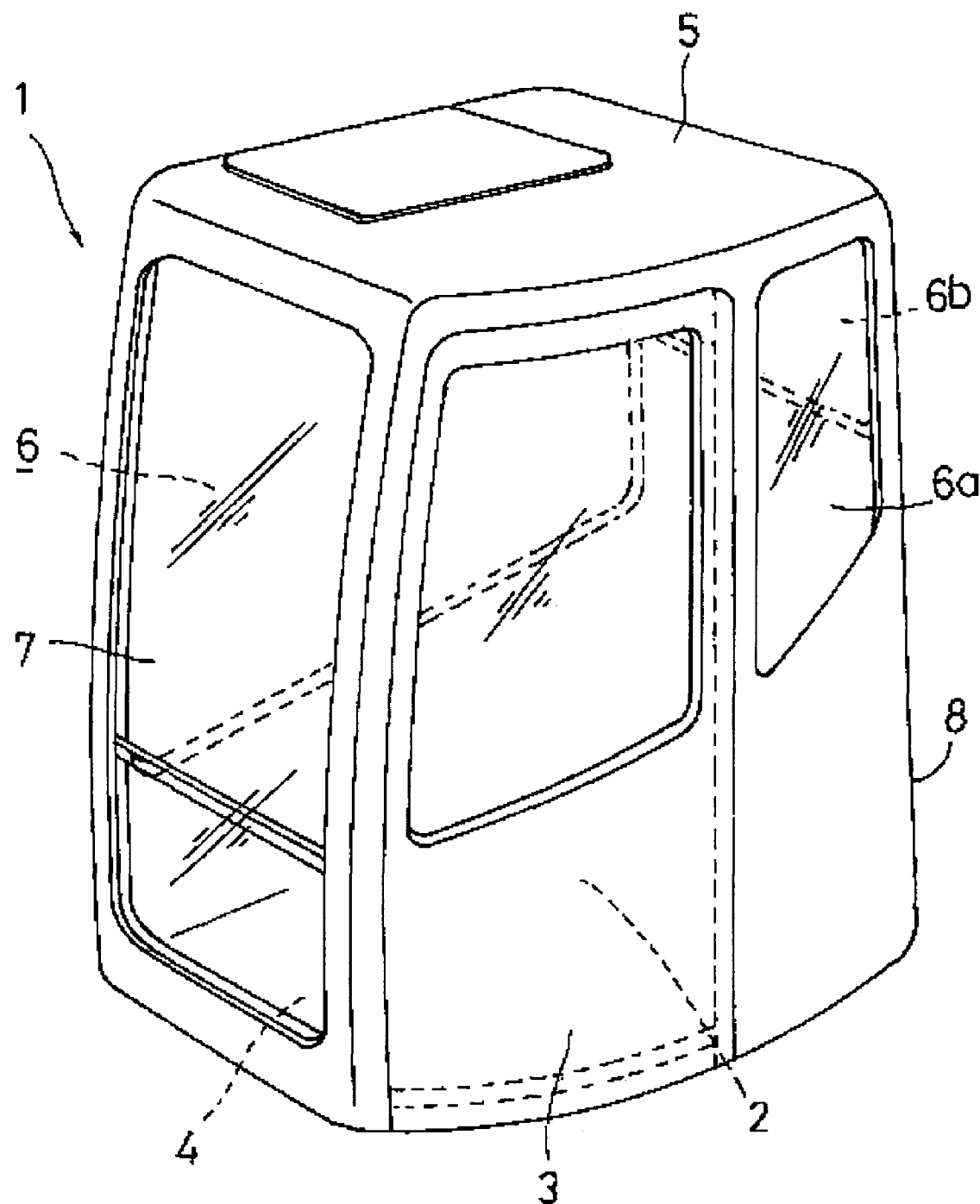
FIG. 1 is a perspective view of a whole of one embodiment of a driver's cab for a work vehicle in accordance with the present invention.
Figure 2:
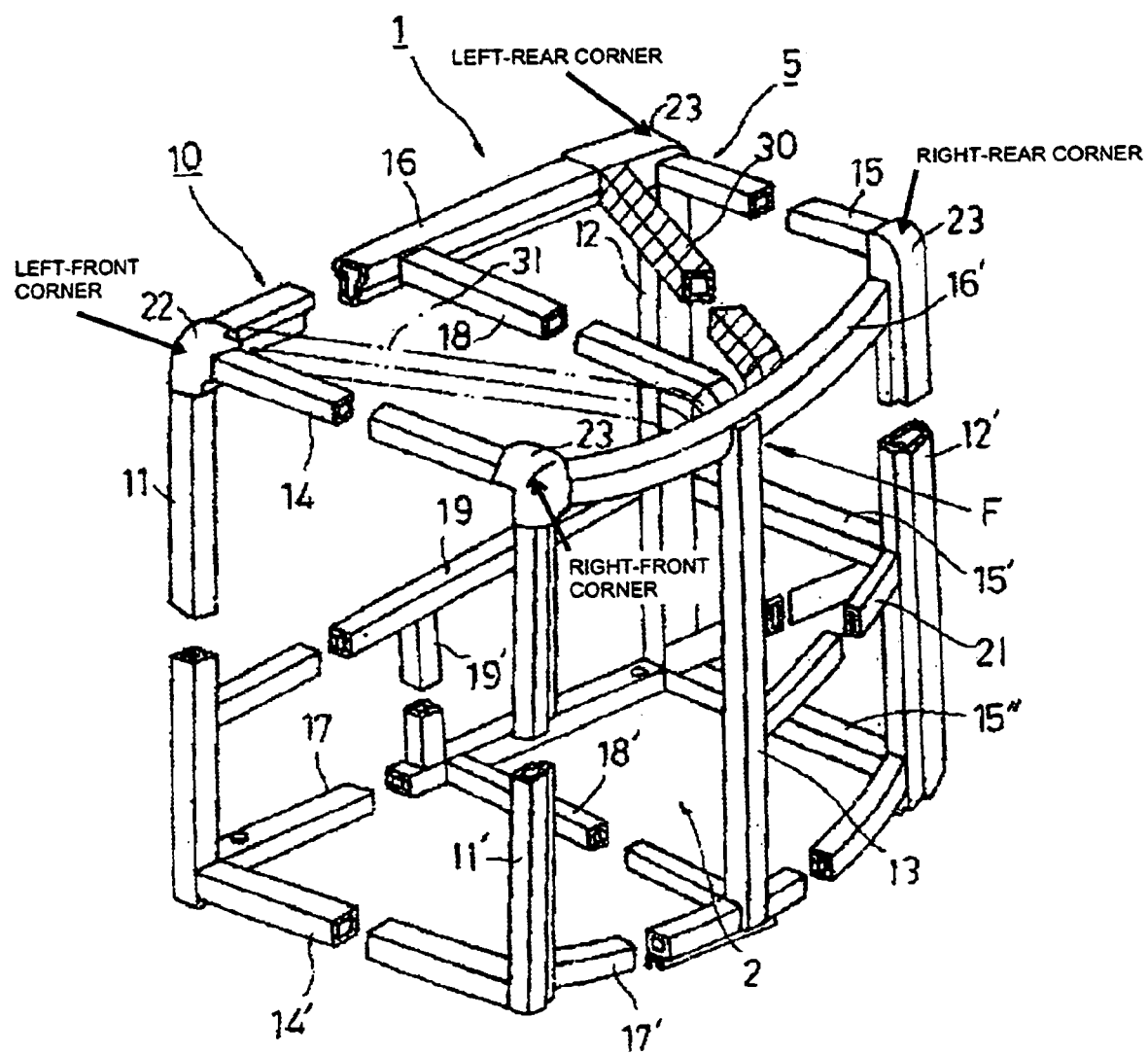
FIG. 2 is a partly cut outline perspective view of one embodiment of a frame forming the driver's cab.
Figure 3:
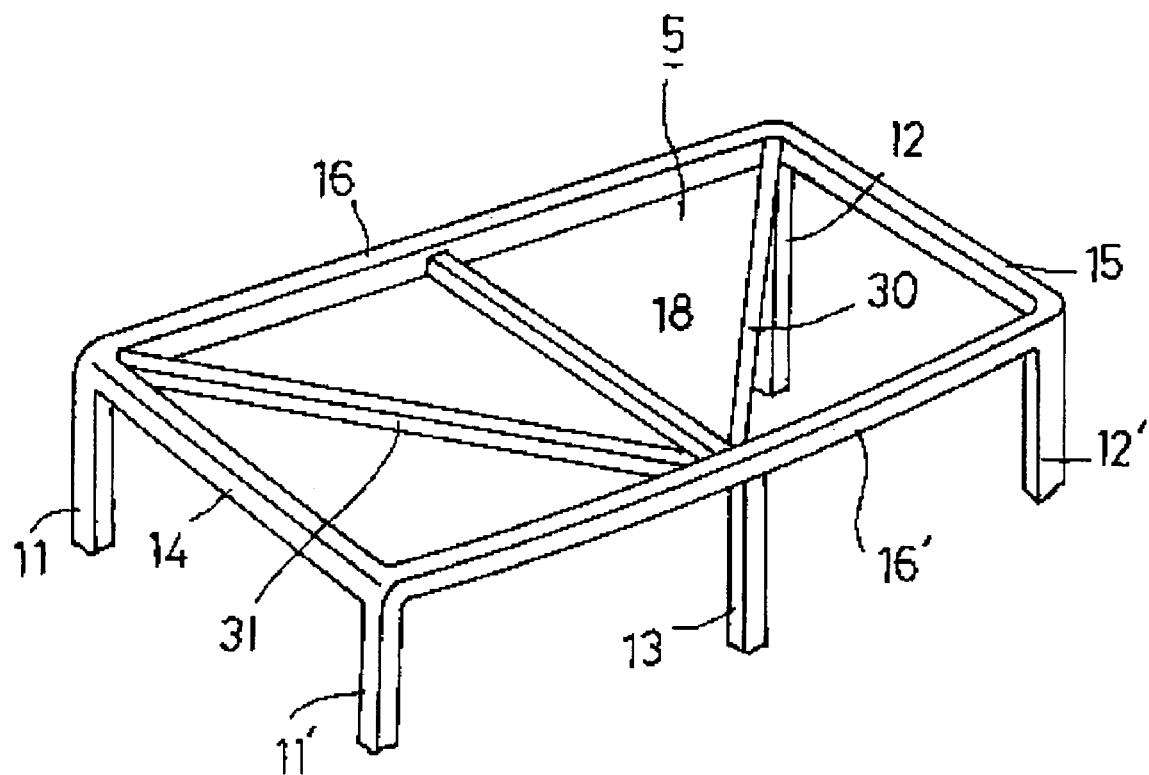
FIG. 3 is a schematic view showing a framework of a ceiling portion in the driver's cab frame.

In FIG. 1, there is shown a perspective view of a whole of one embodiment of a driver's cab for a work vehicle in accordance with the present invention. In FIG. 2, there is shown a partly cut outline perspective view of one embodiment of a frame forming the driver's cab. In FIG. 3, there is shown a schematic view showing a framework of a ceiling portion in the driver's cab frame.

A driver's cab 1 in accordance with the present embodiment will be described with respect to a structure which is mounted on an upper revolving body (not shown) in a excavator.

The driver's cab 1 in accordance with this embodiment is assembled by using a pipe member for a frame 10 constituting the driver's cab. The frame 10 is structured such that with respect to four corner support pillars 11, 11', 12 and 12' and respective vertical members of a middle support pillar 13 for forming an entrance door 2, left and right support pillars 11 and 11' in a front portion (a direction is expressed on the basis of a direction in a placing state) are connected in both end portions of upper and lower sides by transverse members 14 and 14', left and right support pillars 12 and 12' in a rear portion are connected in both end portions of upper and lower sides and a middle portion by transverse members 15, 15' and 15", and both surface portions in front and rear sides are connected in both end portions of respective upper and lower sides by longitudinal members 16, 16', 17 and 17' in a longitudinal direction so as to form an outer hull. In this case, an outer surface (a right side as seen from a front side) in which the entrance door 2 is formed in a convex circular arc shape so that a round type door 3 is attached thereto.

Further, horizontal connection members 18 and 18' are provided at middle positions of the longitudinal members 16 and 16' respectively arranged in the longitudinal direction, in a bottom portion 4 and a ceiling portion 5 of the frame 10 of the driver's cab in which the outer hull is formed. A longitudinal member 19 and a vertical support member 19' for forming a window portion 6 are arranged in a left side surface, and the middle support pillar 13 and the rear support pillar 12' are connected in a right side surface by a connection member 21.

The frame 10 of the driver's cab mentioned above is integrally formed by welding the respective members at the bonding position, and joint pieces 22 and 23 formed in a curved shape are used in the respective bonding portions between upper end portions of the respective support pillars 11, 11', 12 and 12' in the front and rear sides and the transverse members 14 and 15, in which the curved surfaces are required in the bonding portions. Molded outer casing plates are mounted to the respective surfaces of outer side surfaces of the frame 10 structured in the manner mentioned above and the ceiling portion 5 except window forming portions 6, 6a and 6b and the entrance door 2, a front window which can be opened and closed is attached to a front window portion 7, and window glasses are fixedly attached to the window portion 6 on a left side surface, the window portion 6a on a right side surface and the rear window 6b, respectively, thereby structuring the driver's cab 1.

In the driver's cab 1 structured in the manner mentioned above, the structure is made such that a rigidity can be kept by a whole framework with respect to a strength in a normal state and the outer casing plate members mounted so as to cover an outer periphery of the framework. However, for example, in the case that the external force shown by an arrow F in FIG. 2 is applied to an outer side of the ceiling portion 5, in other words, in the case that an inverting load is applied, the transverse member 18 in the middle portion as shown in FIG. 2 can not stand against the external force F, and is deformed. This is because the window portion 6 provided in the left side surface portion for improving a visibility performance at a time of working is formed wide, whereby the external force applied to the transverse member 18 is directly applied to the left longitudinal member 16, and thereafter the force is transmitted to the front and rear support pillars 11 and 12, so that the transmission of the external force to the support pillars 11 and 12 can not be quickly responded. Of course, it is good to increase a cross sectional strength of the longitudinal member 16, however, in this case, there is generated a problem that a size of the member is increased, a weight thereof is increased, and a balance with the other portions is deteriorated.

Then, in accordance with a first embodiment, a connection member 30 which is shown by adding diagonal lines in FIG. 2 is arranged so as to connect between a middle position of the ceiling portion 5 (a middle position of the longitudinal member 16) and a top portion of the left support pillar 12 in the rear portion or a portion close thereto. In this case, the connection member 30 is formed by a pipe member in the same manner as that of the members in the other portions.

By arranging the connection member 30 diagonally in the manner mentioned above, even when there is generated a matter that the external force F as mentioned above is applied to a side portion of the ceiling portion 5, the external force is not transmitted to the support pillar 12 via the longitudinal member 16 but is transmitted to the support pillar 12 immediately through the connection member 30, which is different from the conventional manner, so that it is possible to prevent the deformation.

In accordance with a second embodiment, as the framework of the ceiling portion in the driver's cab frame is shown in FIG. 3 by using the schematic view, in the framework structuring the ceiling portion 5 in the frame 10 mentioned above, connection members 30 and 31 are diagonally arranged and connected between a position of the middle portion in the outer longitudinal member 16' and respective upper end portions of the front support pillar 11 and the rear support pillar 12 connected to the longitudinal member 16 in the opposite side or portions close thereto.

In accordance with the structure mentioned above, even when the external force is applied to the middle position of the outer longitudinal member 16' in the same manner as mentioned above, the external force is immediately transmitted to the front and rear support pillars 11 and 12 by both of the diagonal connection members 30 and 31 and can be set against by the stresses thereof, so that it is possible to prevent the deformation. Of course, since the connection members 30 and 31 use the structure formed by the pipe member in the same manner as the other members, it is possible to easily structure.

Figure 4:
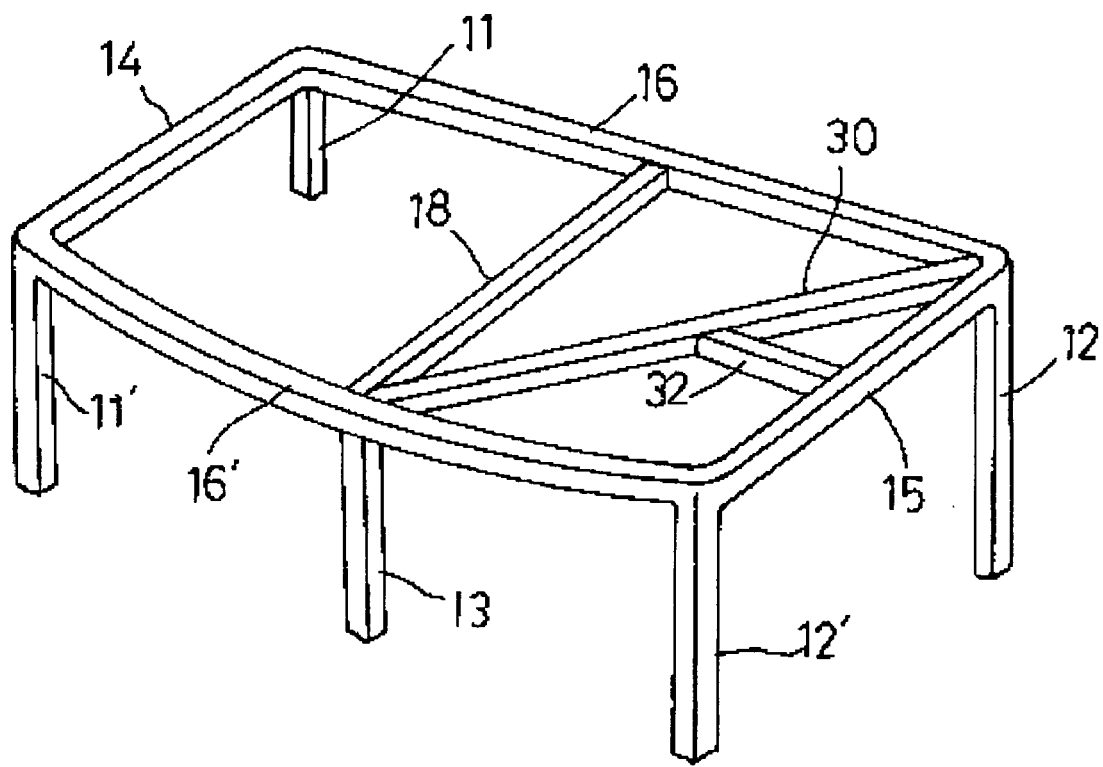
FIG. 4 is a schematic view showing the framework of the ceiling portion in the driver's cab frame.

A third embodiment is structured, as shown by a schematic view showing the framework of the ceiling portion in the driver's cab frame in FIG. 4, such that the diagonal connection member 30 is connected between the middle position of the outer longitudinal member 16' in the ceiling portion 5 and the upper end portion of the rear support pillar 12 connected to the longitudinal member 16 in the opposite side or the portion close thereto, and another short connection member 32 connects between the diagonal connection member 30 and a middle portion of the transverse member 15 in the rear portion. In accordance with the structure mentioned above, the same matter as mentioned above is applied in the case that the external force is applied to the outer side portions, and further, since the force transmission to the rear support pillar 12 can be effectively carried out via the diagonal connection member 30 even in the case that the external force is applied to the ceiling rear portion 5a of the driver's cab 1, it is possible to prevent a local bending deformation, and it is possible to optimize the reinforcement of the frame 10.

Figure 5:
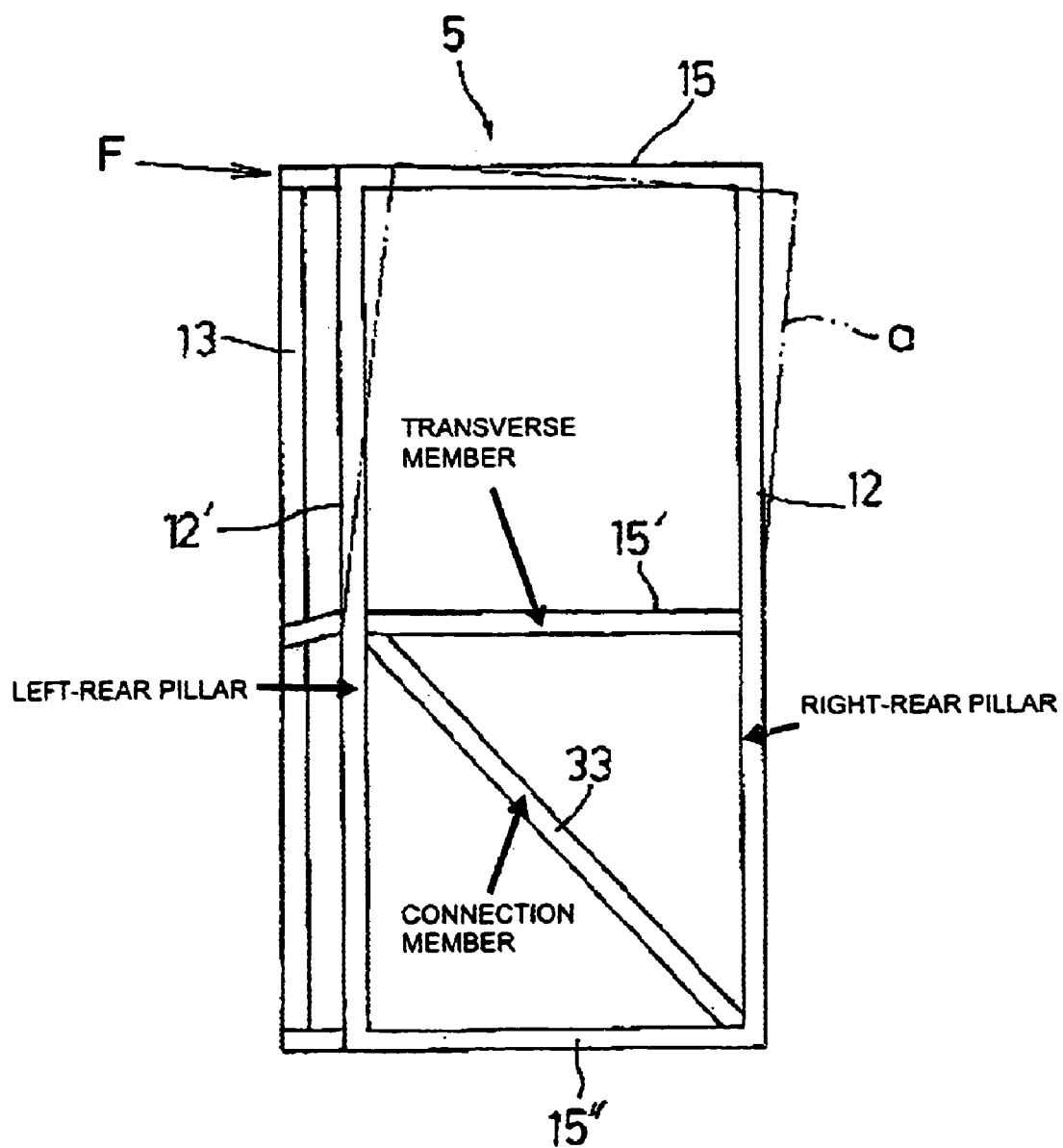
FIG. 5 is a schematic view showing a framework of a rear portion in the driver's cab frame.

A fourth embodiment is structured, as shown by a schematic view showing the framework of the rear portion in the driver's cabin FIG. 5, such that a diagonal connection member 33 is arranged and connected between a connecting portion between the right (outer) support pillar 12' and the transverse member 15' and the lower end portion of the left (inner) support pillar 12, on a surface portion which is equal to or lower than the transverse member 15' connecting the left and right support pillars 12 and 12' structuring the rear surface of the driver's cab 1 at the middle position. In accordance with the structure mentioned above, even if the external force F is applied to the top of the driver's cab from the outer side, an amount of deformation is small as expressed by a two-dot chain line a, and it is possible to prevent a great affection from being applied to the operator within the driver's cab.

In this case, in each of the embodiments mentioned above, the description is given of a single structure, however, when combining the structures so as to intend to reinforce the frame 10 of the driver's cab, it is possible to reinforce the frame as the whole structure and it is possible to optimize, while it is unavoidable that a mass is a little increased compared with the prior art.

Figure 6A:
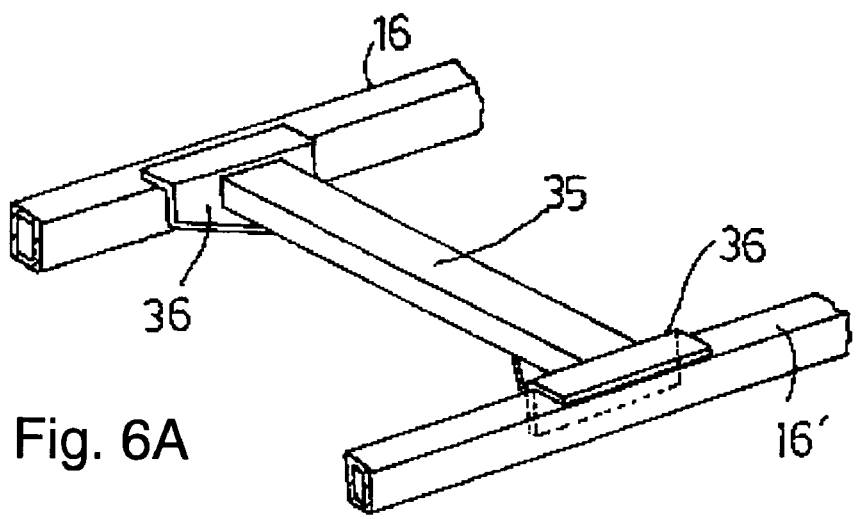
FIGS. 6A to 6C are views showing a mounting aspect of a connection member provided with mounting brackets in both end portions.
Figure 6B:
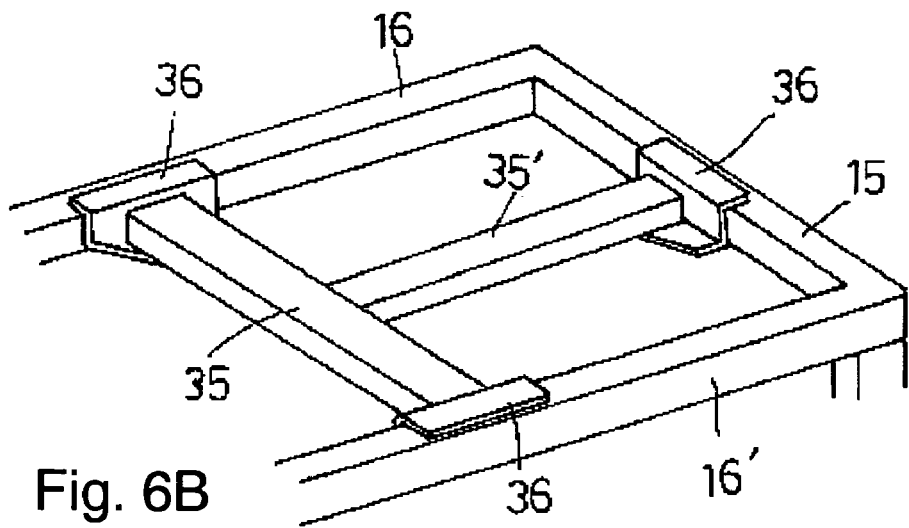
Figure 6C:
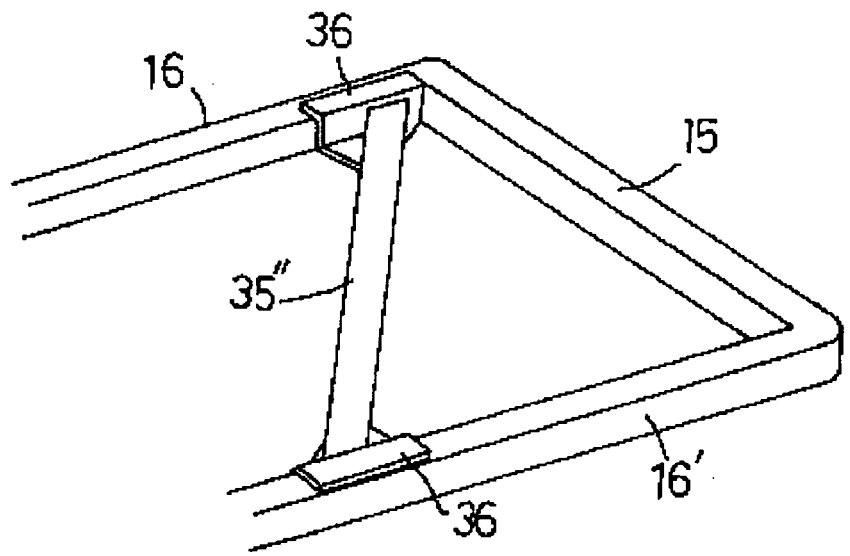

Further, with respect to the connection member or the transverse member mentioned above, as shown in FIGS. 6A to 6C, in the case that the structure is made such that mounting brackets 36 having an L-shaped cross sectional shape are welded and closely fixed to both end portions of a transverse member or connection member 35 (35') connecting between the inner longitudinal member 16 and the outer longitudinal member 16' in an orthogonal state so as to cross to an axis, whereby a size L between outer surfaces of the mounting brackets 36 crossing to the axis of the member becomes a predetermined size, the member provided with the mounting brackets 36 at both ends serves as a jig and tool by applying the frame structure members to be connected to inverted-L-shaped inner corner portions of the mounting brackets 36 so as to weld and connect, as shown in the drawing, so that it is possible to make the assembling work in the manufacturing step easy. In this case, FIG. 6A shows a structure in which the connection member is arranged between the longitudinal members in an orthogonal manner, and FIG. 6B shows an arrangement state of the connection members which are simultaneously bonded between the longitudinal members and to the rear transverse member. Further, FIG. 6C shows a case that the mounting brackets are provided in a diagonal member (a diagonal connection member 35").

Further, in accordance with the connection member 35 or the transverse member provided with the mounting brackets 36 at both end portions mentioned above, it is possible to correctly set the position even at a time of the welding work to the other members to be bonded and the operability is improved, so that it is possible to increase a productivity. Further, since the welding length can be increased and the bonding surface can be secured large, it is possible to connect strongly. In other words, it is possible to further increase an assembling rigidity of the frame so as to optimize.

Accordingly, it is possible to employ the conventional bonding with respect to the specific bonding portion, and employ the member provided with the mounting bracket in other member bonding portions. In this case, it goes without saying that the outer shape of the mounting bracket can be optionally set in correspondence to the used portion.

Figure 7:
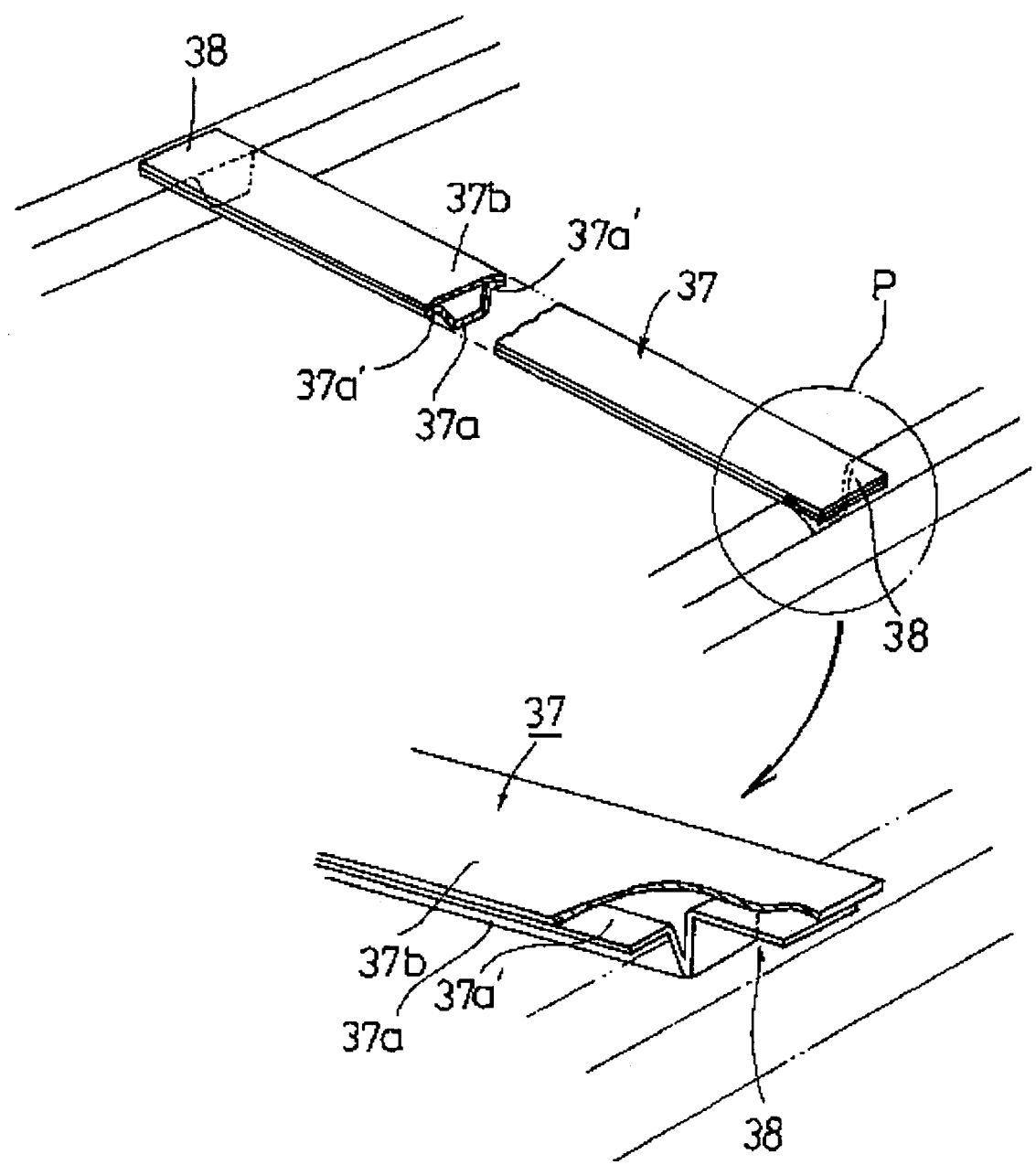
FIG. 7 is a schematic view showing the connection member having another cross sectional shape by using a partly cross sectional view.

Further, FIG. 7 is a perspective view showing the connection member having other cross sectional shape by a partly cross sectioned view. A connection member 37 is obtained by overlapping and bonding a member 37a formed in a hat cross sectional shape from a thin plate member and a band-like flat plate 37b in such a manner as to be astride between both side flange portions 37a' and 37a', in which an end portion of the hat-shaped member 37a is formed flat to the flat plate 37b at both end portions of the connection member 37, a mounting portion 38 is formed in both end portions, in place of the mounting bracket 36 mentioned above. In accordance with the connection member 37 having the structure mentioned above, it is possible to increase a cross sectional strength, and it is possible to achieve a strong reinforcing member by using the thin plate. In this case, with respect to the mounting portion 38, when fitting an independently prepared bracket to the end portion of the hat-shaped member 37a so as to integrally form as occasion demands, it is possible to make a working property easy and it is possible to increase a size accuracy while the number of parts is increased.

In the embodiments mentioned above, the description is given of the structure in which the single pipe member is used as the structure member, however, it is possible to employ a member having a hollow cross sectional shape obtained by combining the plate members as occasion demands.

Further, the driver's cab mentioned above is described with respect to the structure used in the excavator, however, it is possible to be applied to the driver's cab of the other construction machines, farm machine vehicles, cargo handling machine vehicles and the like in accordance with the purpose of the present invention. In this case, it is sufficient to change the shape in correspondence to the vehicle. These structures belong to the technical scope of the present invention.

What is claimed is:

1. A supporting structure for a driver's cab of a work vehicle, which comprises a four-sided horizontal support structure having a left-front corner, a right-front corner, a left-rear corner, a right-rear corner, a front pipe member having ends respectively joined to the left-front and right-front corners, a rear pipe member having ends respectively joined to the left-rear and right-rear corners, a left pipe member respectively having ends joined to the left-front and left-rear corners, a right pipe member respectively having ends joined to the right-front and right-rear corners; vertically extending pillars supporting and joined to said left-front, right-front, left-rear, and right-rear corners; and a connection member diagonally extending between an area adjacent one of the left-front and left-rear corners and a middle area of the right pipe member.

2. The supporting structure for a driver's cab of a work vehicle according to claim 1, wherein the four-sided horizontal support structure is arranged for supporting a ceiling of the driver's cab.

3. The supporting structure for a driver's cab of a work vehicle according to claim 2, wherein the connection member is secured within the four-sided horizontal support structure by a mounting bracket including a first flange fitting a horizontal surface of a corresponding pipe member of the four-sided horizontal support structure, and a second flange fitting a vertical surface of the corresponding pipe member of the four-sided horizontal support structure, the second flange being secured to an end of the connection member.

4. The supporting structure for a driver's cab of a work vehicle according to claim 1, further comprising a middle pipe member connecting between middle portions of the left and right pipe members.

5. The supporting structure for a driver's cab of a work vehicle according to claim 4, wherein the connection member extends between the one of the left-front and left-rear corners and a corner formed between the middle and right pipe members.

6. The supporting structure for a driver's cab of a work vehicle according to claim 5, further comprising a second connection member extending between another one of the left-front and left-rear corners and another corner formed between the middle and right pipe members.

7. The supporting structure for a driver's cab of a work vehicle according to claim 6, wherein the connection member is secured within the four-sided horizontal support structure by a mounting bracket including a first flange fitting a horizontal surface of a corresponding pipe member of the four-sided horizontal support structure, and a second flange fitting a vertical surface of the corresponding pipe member of the four-sided horizontal support structure, the second flange being secured to an end of the connection member.

8. The supporting structure for a driver's cab of a work vehicle according to claim 5, wherein the connection member is secured within the four-sided horizontal support structure by a mounting bracket including a first flange fitting a horizontal surface of a corresponding pipe member of the four-sided horizontal support structure, and a second flange fitting a vertical surface of the corresponding pipe member of the four-sided horizontal support structure, the second flange being secured to an end of the connection member.

9. The supporting structure for a driver's cab of a work vehicle according to claim 4, wherein the connection member is secured within the four-sided horizontal support structure by a mounting bracket including a first flange fitting a horizontal surface of a corresponding pipe member of the four-sided horizontal support structure, and a second flange fitting a vertical surface of the corresponding pipe member of the four-sided horizontal support structure, the second flange being secured to an end of the connection member.

10. The supporting structure for a driver's cab of a work vehicle according to claim 1, further comprising a second connection member extending between an area adjacent another one of the left-front and left-rear corners and a middle area of the right pipe member.

11. The supporting structure for a driver's cab of a work vehicle according to claim 10, wherein the connection member is secured within the four-sided horizontal support structure by a mounting bracket including a first flange fitting a horizontal surface of a corresponding pipe member of the four-sided horizontal support structure, and a second flange fitting a vertical surface of the corresponding pipe member of the four-sided horizontal support structure, the second flange being secured to an end of the connection member.

12. The supporting structure for a driver's cab of a work vehicle according to claim 1, further comprising another connection member extending between the connection member and the rear pipe member.

13. The supporting structure for a driver's cab of a work vehicle according to claim 12, wherein the another connection member extends orthogonally from the rear pipe member.

14. The supporting structure for a driver's cab of a work vehicle according to claim 12, wherein the connection member is secured within the four-sided horizontal support structure by a mounting bracket including a first flange fitting a horizontal surface of a corresponding pipe member of the four-sided horizontal support structure, and a second flange fitting a vertical surface of the corresponding pipe member of the four-sided horizontal support structure, the second flange being secured to an end of the connection member.

15. The supporting structure for a driver's cab of a work vehicle according to claim 1, wherein the vertically extending pillars include a left-rear pillar and a right-rear pillar, a transverse member extending between middle portions of the left-rear and right-rear pillars, and another connection member diagonally extending between the left-rear pillar and the right-rear pillar.

16. The supporting structure for a driver's cab of a work vehicle according to claim 15, wherein the another connection member is arranged below the transverse member.

17. The supporting structure for a driver's cab of a work vehicle according to claim 1, wherein the connection member is secured within the four-sided horizontal support structure by a mounting bracket including a first flange fitting a horizontal surface of a corresponding pipe member of the four-sided horizontal support structure, and a second flange fitting a vertical surface of the corresponding pipe member of the four-sided horizontal support structure, the second flange being secured to an end of the connection member.

18. The supporting structure for a driver's cab of a work vehicle according to claim 1, wherein the connection member is a collared pipe-shaped member having a trapezoidal cross-section, the collared pipe-shaped member including a lower member and a flat member, the lower member having flanges at both ends thereof and side flanges extending along sides thereof, the lower member also having a flat bottom and sides extending from edges of the flat bottom at an obtuse angle, and the flat member being bonded to the flanges of the lower member.

* * * * *